INVENTORS
ERNEST L. HEFFLEY
LOUIS J. MILLER
BY
ATTORNEY

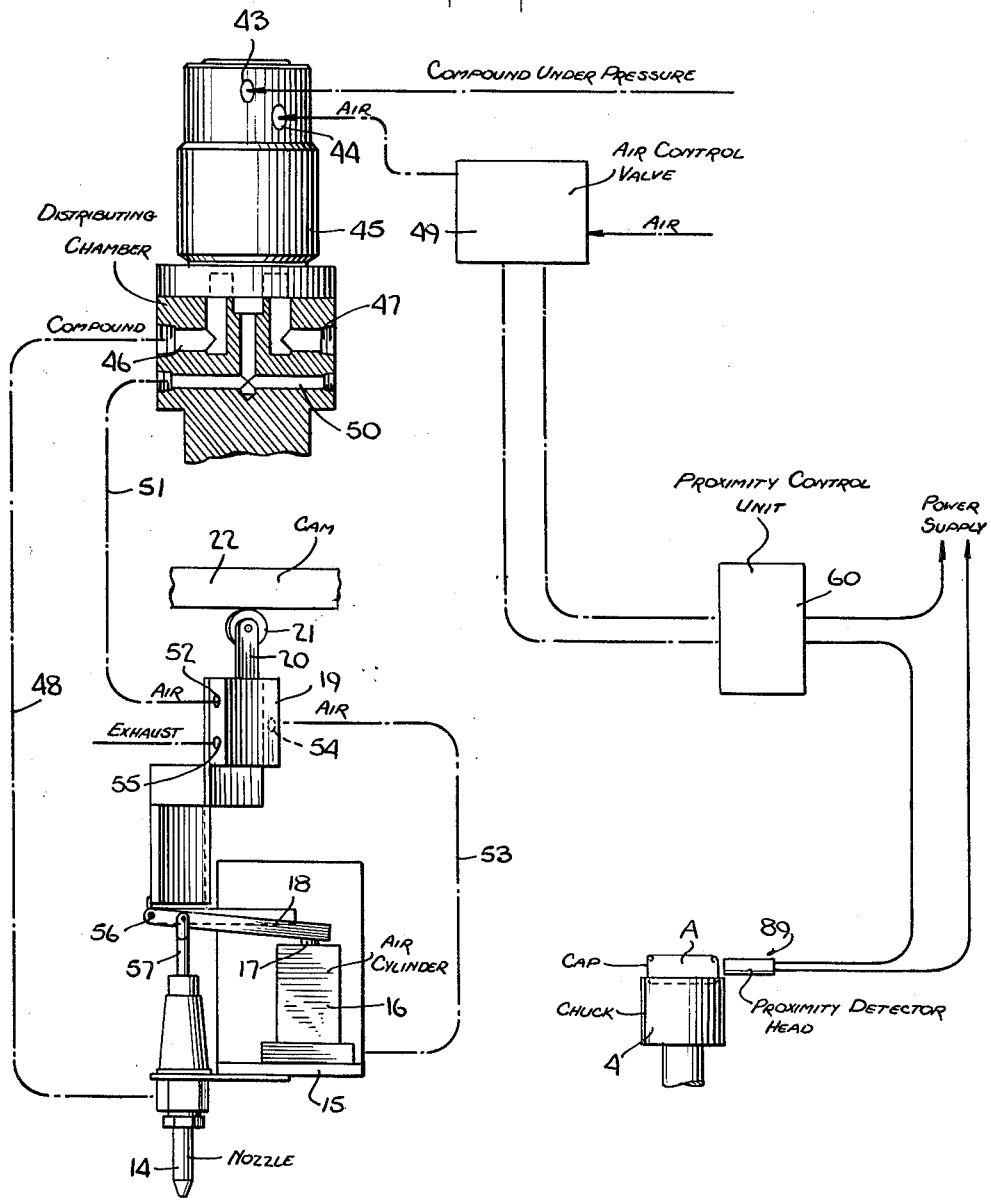

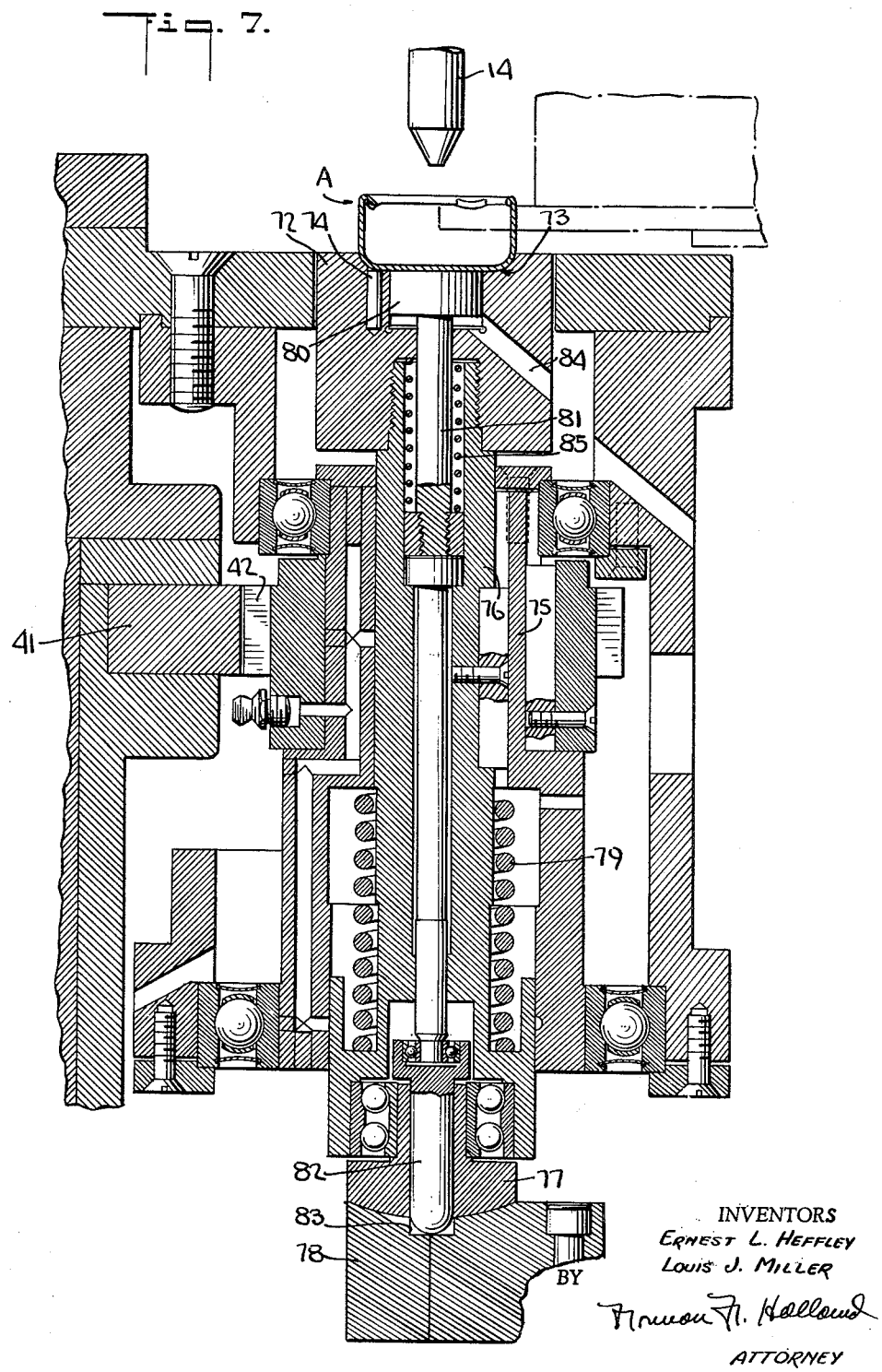

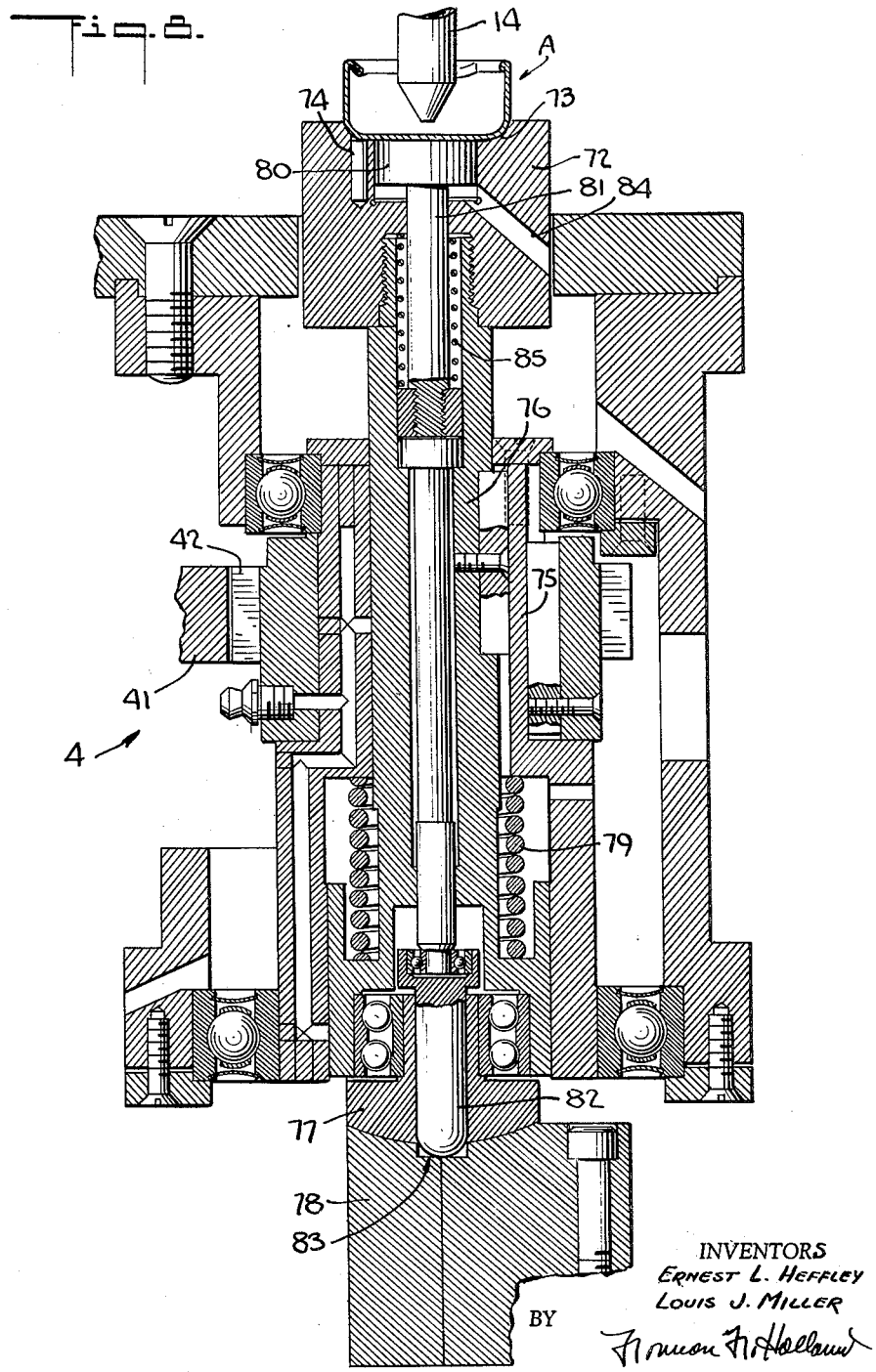

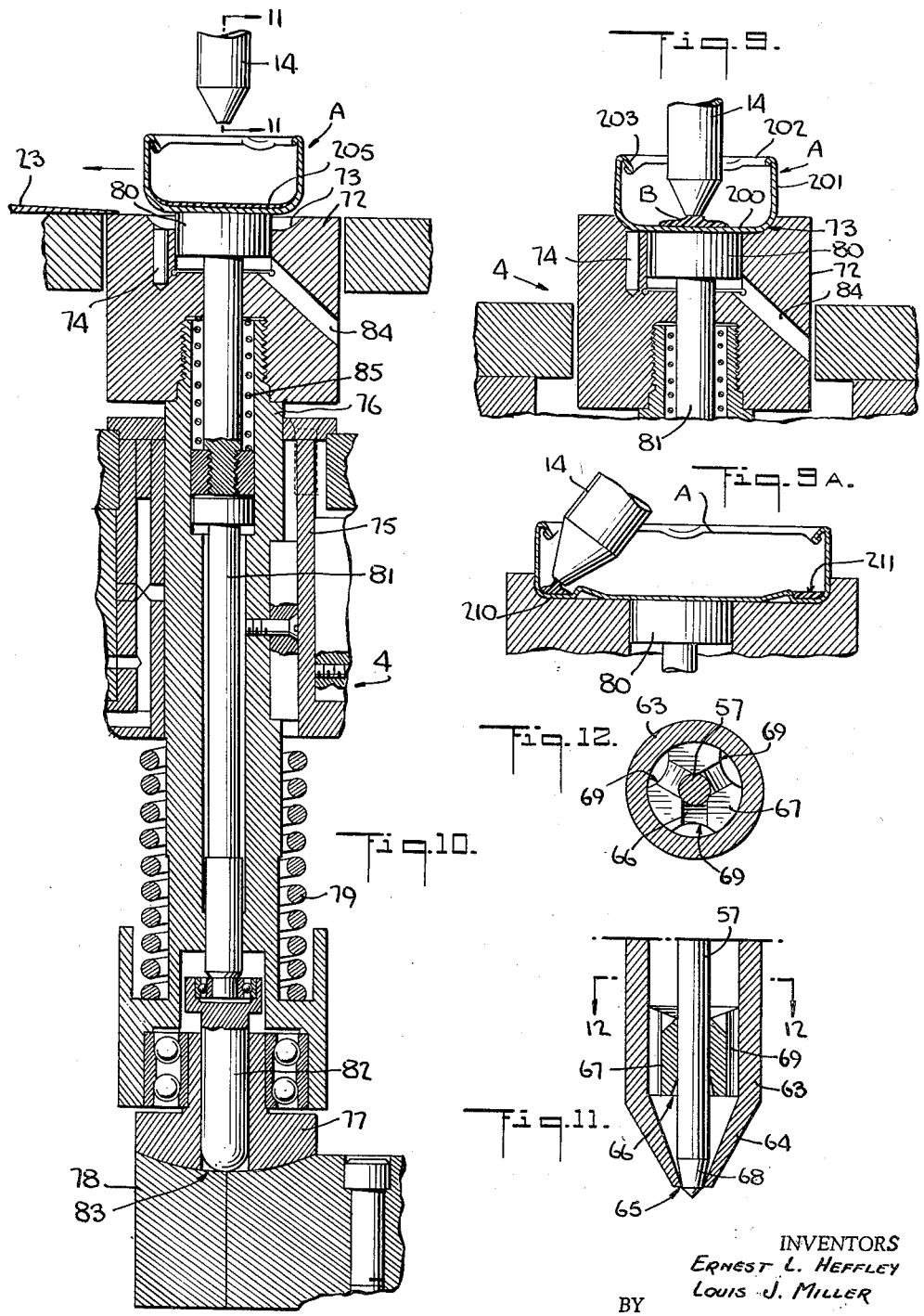

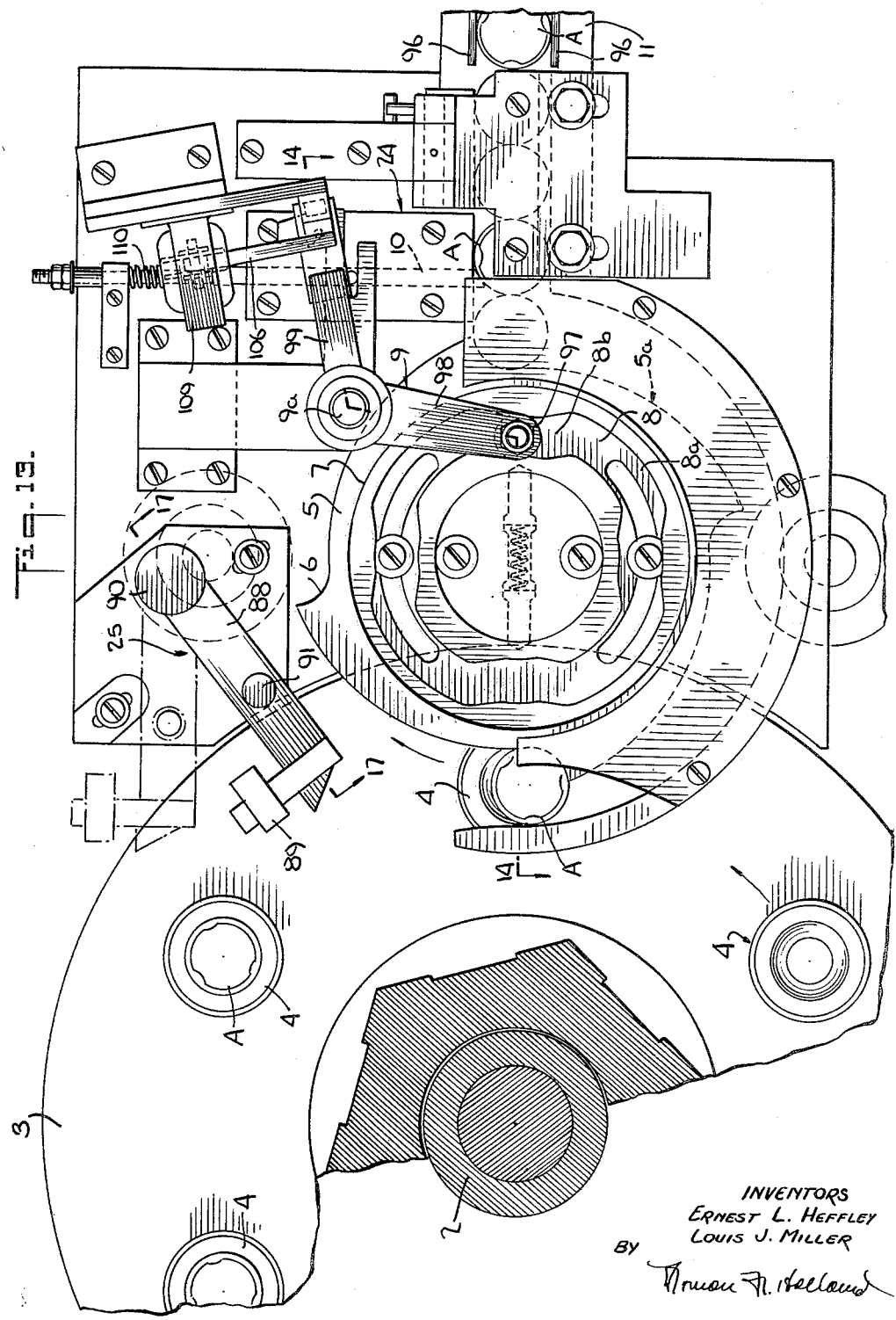

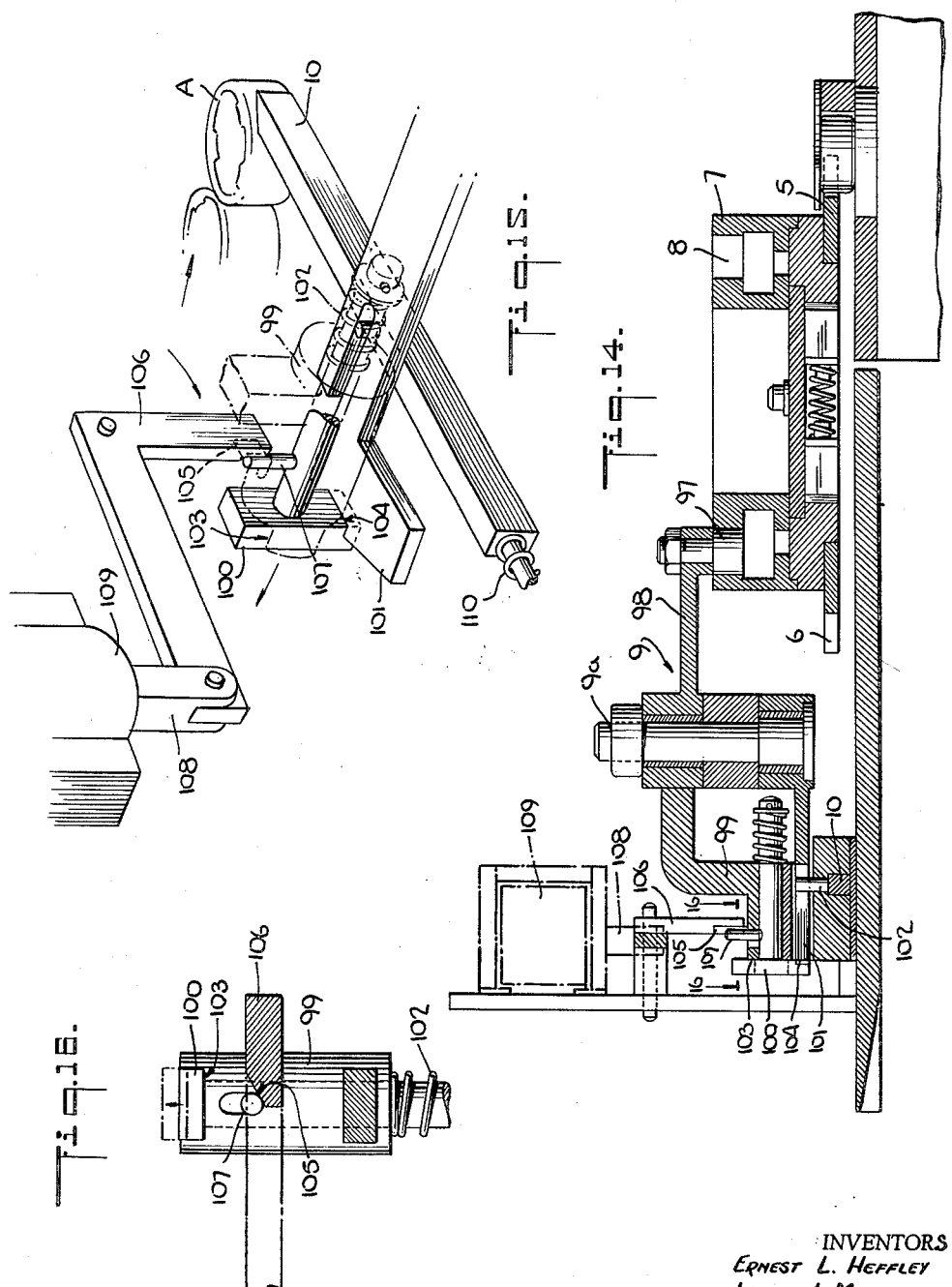

United States Patent Office 3,053,221
Patented Sept. 11, 1962

3,053,221
MECHANISM AND METHOD FOR
APPLYING GASKETS
Ernest L. Heffley and Louis J. Miller, Connellsville, Pa.,
assignors to Anchor Hocking Glass Corporation, Lancaster, Ohio, a corporation of Delaware
Filed Apr. 15, 1959, Ser. No. 806,703
6 Claims. (Cl. 118—2)

The present invention relates to an improved mechanism and method for applying sealing gaskets or liners to closure caps and more particularly to an improved mechanism which will deposit gasket material on the inside of a closure shell to form a suitable sealing gasket therein.

The increasing use of food products which are preferably packaged in hermetically sealed containers presents a continually growing demand for improved sealing closures. Such sealing closures are provided with sealing gaskets which cooperate with the rims of the container when the caps are applied thereto to form a hermetically sealed package.

One method of forming sealing gaskets in closure shells is to flow a liquid gasket material into a rotating closure and to thereafter harden the gasket material. Recently, a material called "plastisol" has been increasingly used to form these sealing gaskets. Plastisol usually comprises the combination of a liquid plasticizer and a resin which does not dissolve in the plasticizer at normal room temperatures. This permits the plastisol to be applied to closures as a viscous liquid at room temperatures. When heat is thereafter applied the resin is dissolved in the plasticizer and the plastisol hardens into a rubber-like state. This transformation is called "fluxing."

In view of the increasing number of closure caps required, it is desirable that mechanisms for forming the gaskets operate at greater speeds and take up a minimum amount of space.

The present invention provides a novel mechanism and method for applying gasket material to closure caps at greater speeds so as to reduce substantially the number of units necessary to meet the requirements of commercial production.

The present machine is also adapted for rapid changeover from one cap size to another. This is done by minimizing the number of parts which must be changed and also by making these parts relatively simple. This permits the simplified parts to be readily exchanged in the change-over operation and also permits the necessary number of change-over parts for a wide variety of closure shapes and sizes to be made available at a minimum expense.

Accordingly, an object of the present invention is to provide an improved mechanism and method for applying gaskets to closure caps.

Another object of the present invention is to provide a mechanism and method for applying gasket material to closure caps at a substantially higher rate than heretofore possible.

Another object of the present invention is to provide an improved continuously operating mechanism for applying a gasket material to a closure cap which will operate with a minimum amount of supervision.

A further object of the present invention is to provide an improved mechanism for applying a gasket material to a closure cap which can easily be adapted to apply gasket material to closure caps of varying sizes.

Another object of the present invention is to provide an improved mechanism for applying gasket material to closure caps in which the speeds of different portions of the machine can be altered independently of one another.

A further object of the present invention is the provision of an improved nozzle which will deposit an accurate amount of gasket material and which will not drip after it is closed.

A further object of the present invention is to provide a mechanism for applying a gasket material to a closure cap which will automatically prevent the nozzle from injecting gasket material if there is no closure present.

Another object of the present invention is to provide a mechanism for applying a gasket-material to closure caps in which provision is made to operate a warning signal if there is a jam-up of caps in the mechanism.

Another object of the present invention is the provision of an improved mechanism for applying a gasket to a closure cap which provides means for positively feeding closure caps.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 6 is a diagrammatic view showing the means for controlling the opening and closing of the nozzle and for feeding the gasket compound to the nozzle;

FIG. 7 is a sectional view of the cap-retaining spindle showing its lowered position immediately after a cap has been deposited thereon;

FIG. 8 is a sectional view similar to FIG. 7 showing the spindle in its raised position with the nozzle within the cap in position to deposit gasket material therein;

FIG. 9 is a sectional view similar to FIG. 8 showing the nozzle depositing gasket material in the closure cap;

FIG. 9a is a view similar to FIG. 9 showing the position of the nozzle when a ring gasket is to be formed;

FIG. 10 is a sectional view similar to FIG. 8 showing the spindle in its lowered position after the gasket material has been deposited in the cap and showing the cap raised in position to be taken off the spindle;

FIG. 11 is a sectional view of the improved nozzle used with the present invention showing the relationship of the needle to the nozzle when in its closed position;

FIG. 12 is a sectional view taken along line 12—12 of FIG. 11 showing the means for centrally positioning the needle in the nozzle;

FIG. 13 is a plan view showing the means for controlling the cap feed and showing the mechanism for preventing the gasket material from being deposited when there is no cap in a spindle;

FIG. 14 is a sectional view taken along line 14—14 of FIG. 13 showing the parts of the cap-feed control mechanism;

FIG. 15 is a perspective view of the cap feed mechanism shown in FIG. 14;

FIG. 16 is a sectional view taken along line 16—16 of FIG. 14 showing the means for preventing the operation of the cap feed mechanism.

Figure 1:
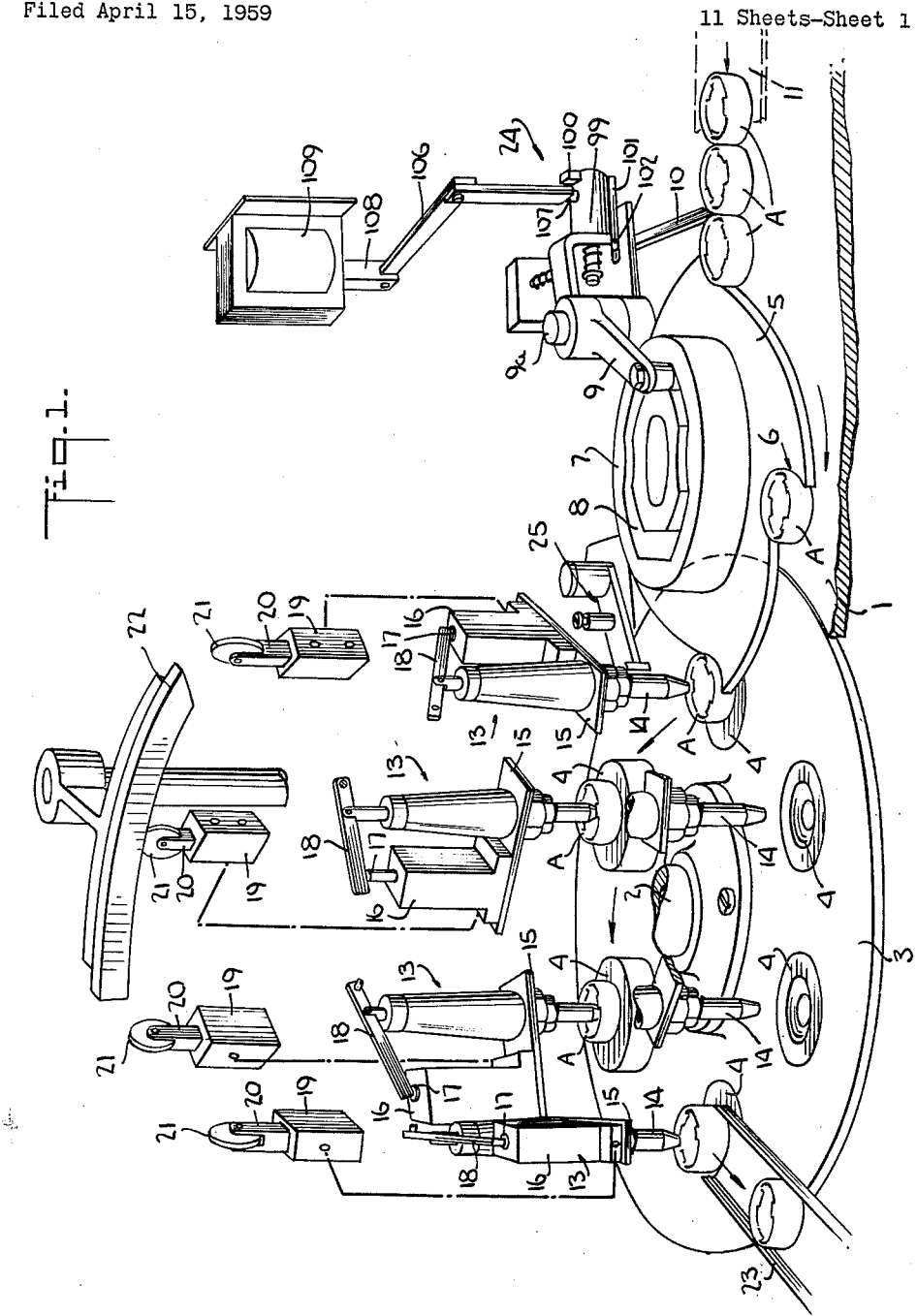
FIG. 1 is a simplified diagrammatic perspective view of the mechanism of the present invention showing its general operation.

The mechanism of the present invention will first be described generally and the specific features of the mechanism will be described under appropriate headings.

General Description

The closure cap A in connection with which the present invention will be described is shown in FIG. 9 and comprises a cover portion 200 and a depending skirt portion 201. The skirt portion 201 has its edge rolled into a bead 202 and a plurality of retaining lugs 203 are formed in the bead to permit the cap to be applied to a container. It will be understood that the particular closure cap is described only for illustrative purposes and that the present invention may be used with any other type of closure cap.

The method of flowing a gasket material B, such as a plastisol, into the closure cap A is also shown in FIG. 9. The cap A is placed in an inverted position on a suitable spindle 4 and rotated at about 600 r.p.m. The gasket material B is ejected from a nozzle and deposited on the inside of cover 200 of the rotating cap A. The rotation of the cap A spreads the gasket material B over the cover 200 to form the gasket 205 (FIG. 10). Heat is then applied to harden the gasket material into a rubber-like gasket to complete the closure cap.

As shown in FIG. 9a, the present invention may also be adjusted to apply gasket material along a peripheral channel 210 in the cover of the cap to form a ring gasket 211. This is done by adjusting the nozzle to a position overlying the channel 210 to inject the gasket material into the channel.

Referring more particularly to FIG. 1, a frame member 1 is provided with a rotating turret shaft 2 on which is mounted a turret 3 adapted to turn with the rotating turret shaft 2. The turret 3 is provided with a plurality of vertically adjustable cap-receiving rotating spindles 4 adapted to receive a cap A from a rotating star wheel 5.

The rotating star wheel 5 is provided with a plurality of cap-receiving pockets 6 each of which receives a cap from a source of caps 11 and deposits the cap on the rotating spindles 4 of the turret 3. Caps are admitted from the continuously moving conveyor belt 11 to the star wheel 5 by a reciprocating gate 10. When the gate 10 is withdrawn a cap A advances and lodges itself in the cap-receiving pocket 6 of star wheel 5. Rotation of the star wheel 5 will then deposit the cap in one of the rotating spindles 4 on the turret 3.

The turret 3 has a plurality of nozzle assemblies, generally designated as 13, located above each of the rotating spindles 4 to deposit a charge of gasket material into the closure caps A.

Each nozzle assembly 13 comprises an ejection nozzle 14 mounted on a bracket 15 on which is also mounted an air cylinder 16. The air cylinder 16 operates a lever 18 which is mounted on a needle (not shown) in the nozzle which normally maintains the nozzle closed. When air is admitted to air cylinder 16 the lever 18 will be raised to raise the needle and open the nozzle to permit the gasket compound to be deposited in to the closure caps A.

Air is supplied to air cylinder 16 through air valve 19 which is normally closed by a plunger 20. The plunger 20 is adapted to be brought under and depressed by a stationary cam 22 acting on cam roller 21 to open the air valve 19 and supply air to the air cylinder 16 thus opening the nozzle 14. When the cam roller 21 passes the stationary cam 22, the plunger 20 is raised to close the air valve 19 thereby shutting off the supply of air to air cylinder 16 to thereby close the nozzle 14.

Before the nozzle 14 is opened to deposit a charge of gasket compound the spindle 4 is raised by a suitable cam (not shown) so that the head of the nozzle 14 enters the closure cap (FIG. 9) so that accurate deposition of the gasket compound within the closure is assured. After the nozzle 14 is closed, as described above, the spindles 4 are lowered by a suitable cam and the cap A is then taken off the turret by a suitable take-off chute 23.

If it is desired to apply gasket material to caps of different sizes, the machine may be adapted to take such caps by merely replacing the star wheel 5 and the chuck in the spindles 4.

A proximity detector mechanism 25 is provided to prevent the nozzle from opening if there is no cap in a spindle and to warn the operator if the caps jam up on the turret.

Feed control means, generally designated by the reference character 24, are also provided to positively position the caps A in the cap-receiving pockets 6 of the star wheel 5.

Drive Mechanism

In order to provide for independent speed adjustment of the turret and the spindles separate drive motors are provided for each. The drive mechanism for rotating the turret 3, star wheel 5 and spindles 4 is shown in FIGS. 3, 4, and 5.

Figure 3:
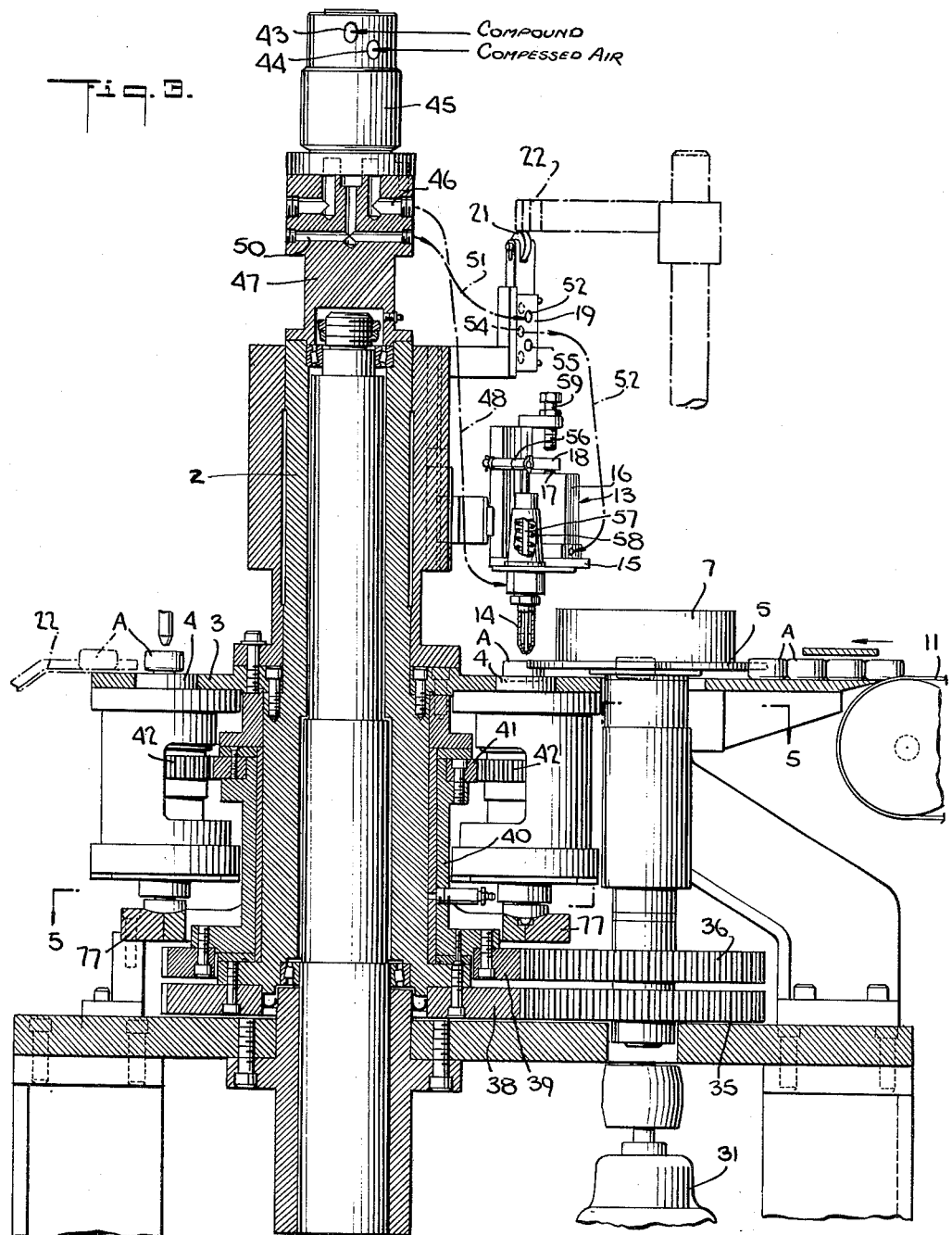
FIG. 3 is a sectional view taken along line 3—3 of FIG. 2 showing the rotating turret and its associated drive mechanism.
Figure 4:
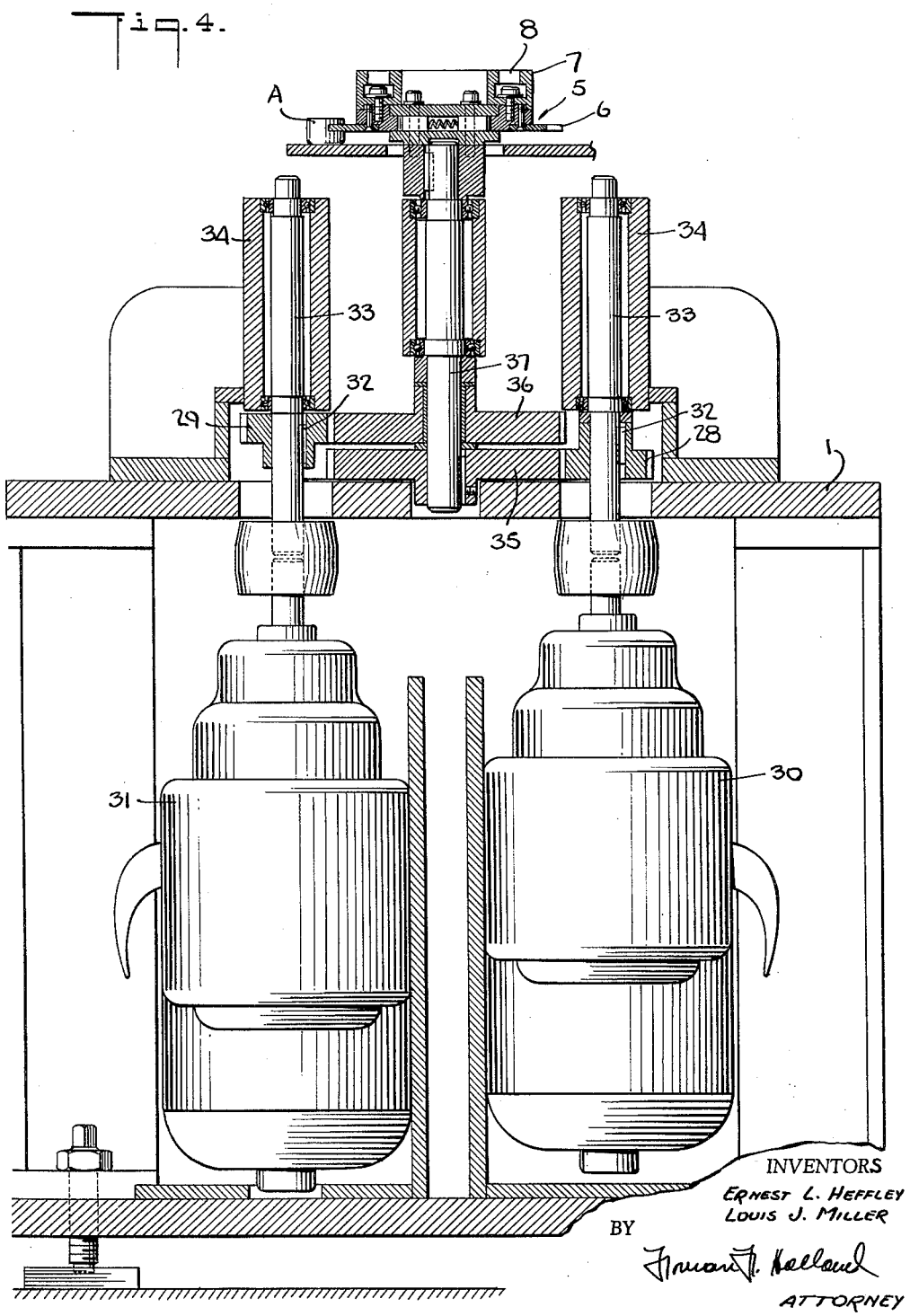
FIG. 4 is a sectional view taken along line 4—4 of FIG. 2 showing the preferred drive means for independently driving the turret and the spindles.
Figure 5:
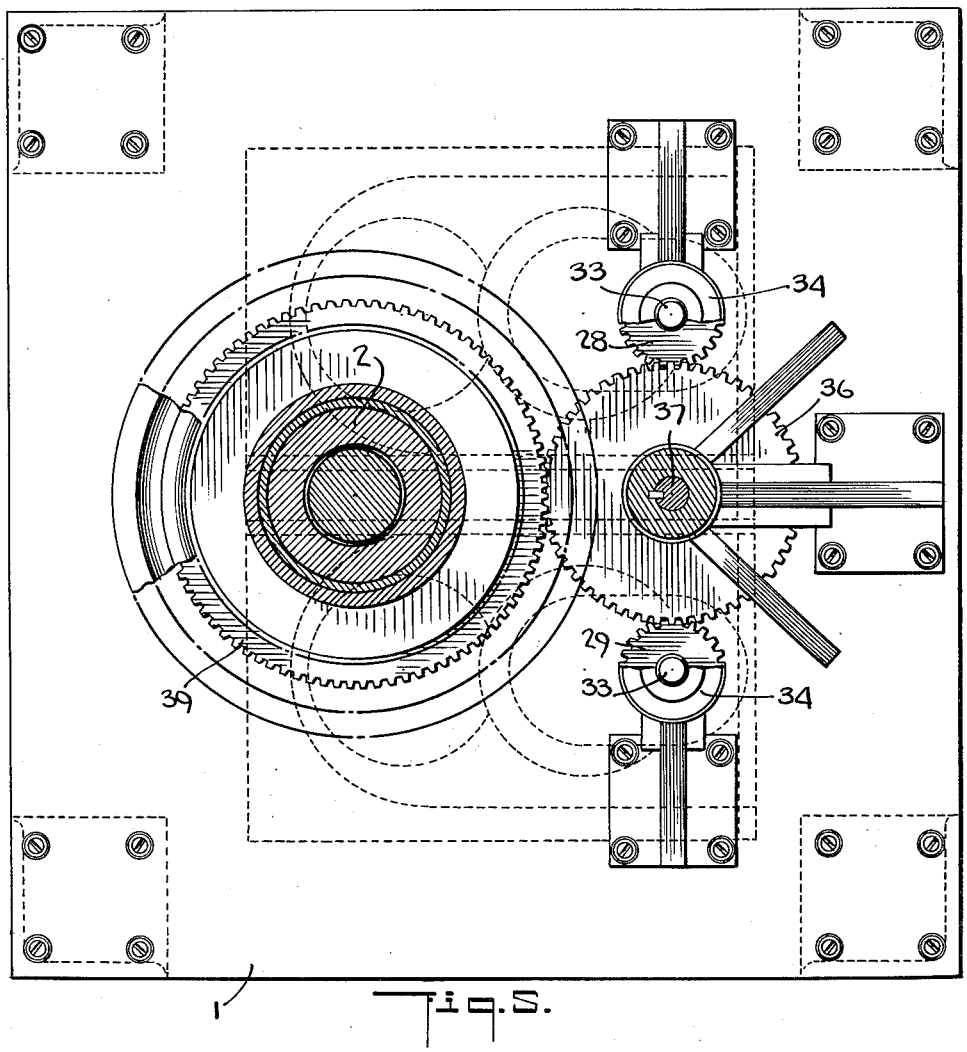
FIG. 5 is a sectional view taken along line 5—5 of FIG. 3 showing the gear mechanisms for driving the rotating turret.

Referring to FIGS. 3 and 4, drive gears 28 and 29 are driven by suitable variable speed drive motors 30 and 31, respectively. The drive gears 28 and 29 are each splined at 32 to drive shafts 33 which are journalled in journals 34 mounted on the frame 1 and which are connected to drive motors 31 and 30.

The drive gears 28 and 29 mesh with gears 35 and 36, respectively, which are in superimposed relation to each other. The lower gear 35 is splined to the drive shaft 37 of the star wheel 5 and also meshes with turret-drive gear 38 (FIG. 3) on the turret shaft 2 to rotate the star wheel 5 and the turret 3 in synchronism so that the caps A being fed by the star wheel 5 are positioned on the spindles 4 of the turret 3.

The upper gear 36 is journalled for rotation on the star wheel shaft 37 and it is connected to each of the drive gears 42 on the spindles 4 through the intermediation of lower gear 39 (FIG. 3), sleeve 40, and upper gear 41 on the sleeve 40. The independent drive for the spindle 4 permits the rotational speed of the spindles 4 to be adjusted independently of the speed at which the turret 3 is rotated.

The speed of the two motors 30 and 31 may be varied independently as conditions require. For example, it may be desired to rotate spindles 4 at a greater or lesser speed. By changing the speed of the motor 31 the rotational speed of the spindles 4 is changed without affecting the speed of the turret 3 or star wheel 5. Conversely, if it is desired to change the speed of the turret 3 and the star wheel 5, this can be accomplished by changing the speed of motor 30 without affecting the speed of the spindles 4.

Nozzle Structure

The improved nozzle 14 particularly adapted to be used with the present invention is shown in FIGS. 11 and 12. The nozzle comprises a hollow cylindrical body portion 63 which is tapered at its lower end 64 to provide a nozzle opening 65.

The control needle 57 is held in a centrally located position within the nozzle 14 by means of an elongated centering member 66 shown in the drawing as having three legs 67 abutting the side walls of the nozzle to hold the needle 57 accurately centered and aligned with the opening 15 in the nozzle 14. The needle 57 is provided with a tapered tip 68 which fits into the opening 65 of the nozzle to hold it in a closed position. The centering member 66 is provided with arcuate spaces 69 between the radial legs 67 to permit the gasket material to pass therethrough and be ejected from the nozzle opening 65.

When the needle 57 is lifted, its tapered tip 68 will be retracted from the opening 65 of the nozzle to permit the sealing compond to pass through the arcuate openings 69 in the centering member 66 and be ejected through opening 65 and onto a closure cap, as shown in FIG. 9.

When sufficient gasket compound has been deposited on a closure cap, the needle 57 is lowered so that the tapered tip 68 of the needle fits into the nozzle opening 65 to cut off the delivery of gasket compound. Since there is no cavity beyond the opening 64 when the nozzle is closed as illustrated in FIG. 11, gasket material has no place to be trapped. Hence, there is no dripping from the closed nozzle and the flow of gasket compound stops the instant the needle is lowered providing greater accuracy in the amount of gasket material deposited in a closure cap.

Gasket Material Applying Mechanism

The gasket material applying mechanism is shown in FIG. 3 and FIG. 6.

The gasket compound is supplied under pressure to an inlet orifice 43 in a housing 45 mounted on the turret shaft 2. The orifice 43 communicates with an outlet orifice 46 in a rotating distributing chamber 47 to supply the gasket material to the nozzle 14 through a conduit 48.

Compressed air is also supplied to an inlet orifice 44 in the housing 45 through an air control valve 49 (FIG. 6) from a suitable source (not shown). The inlet 44 communicates with an outlet orifice 50 to supply air to the air valve 19 through a conduit 51 connected to the air inlet 52 of the air valve 19. The air is supplied through air outlet 54 to the air cylinder 16 by a conduit 53.

Communication between inlet 52 and outlet 54 in air valve 19 to permit air to be delivered to the air cylinder 16 is controlled by the spring pressed plunger 20 which is adapted to be depressed by the action of the stationary cam 22 on its follower 21. When the stationary cam 22 acts on follower 21 the plunger 20 is depressed to place the inlet 52 in communication with outlet 54 and permit air to be delivered to air cylinder 16 to open the nozzle 14. When the cam follower 21 is out from under the cam 22, the spring pressed plunger 20 will rise thereby disengaging the communication between inlet 52 and outlet 54 to stop the delivery of air to the air cylinder 16 and placing the outlet 54 in communication with exhaust port 55 to relieve the air pressure in the air cylinder 16 and permitting the nozzle 14 to close.

The air cylinder 16 is provided with a piston (not shown) having a piston rod 17 extending upwardly therefrom which mounts one end of the control lever 18. The other end of the lever 18 is pivoted on a stationary pivot 56. The needle 57 is located in the nozzle 14 and normally keeps the nozzle closed by the action of spring 58 (FIG. 3). The upper end of the needle 57 is mounted on the control lever 18 so that when air piston rod 17 is raised by the delivery of air to the air cylinder 16 the lever 18 will rock on its pivot 56 to raise the needle 57 from its nozzle closing position and permit gasket material to be ejected therefrom. When the air is cut off from the air cylinder 16 the pressure within the cylinder is relieved (as explained hereinabove) thereby permitting the needle to be depressed by its spring 58 (FIG. 3) to its nozzle-closing position. The amount of gasket compound ejected may be controlled by adjustment of set screw 59 (FIG. 3) above piston rod 17 which acts as a stop for the thrust of the piston rod 17.

A proximity detector mechanism 25, which will be more fully discussed hereinafter, is electrically connected through proximity control unit 60 (FIG. 6) to air control valve 49 which controls the supply of air to the distributing chamber 47. As long as the spindle 4 has a cap A therein the proximity control unit 60 remains energized and air is supplied so that the nozzle may be opened to eject sealing compound.

Between caps the proximity control unit 60 is deenergized so that no compound is ejected. However, if there is no cap in the spindle 4 the detector will not re-energize the proximity control unit 60 which maintains the air control valve 49 closed to stop the air supply and prevent the nozzle from being opened to eject gasket compound.

Spindle Structure

The spindle 4 adapted to hold a closure cap while the gasket material is being applied is shown in FIGS. 7 to 10.

The spindle 4 comprises an elevatable chuck 72 having a cup-shaped cap-receiving portion 73 and a plurality of permanent magnets 74 to retain a closure cap therein. The chuck 72 is rotated with the spindle 4 through the intermediation of upper gear 41, spindle gear 42, sleeve 75 keyed to spindle gear 42, and chuck shaft 76 which is keyed to sleeve 75 and threadably connected to the chuck 72.

The lower edge of the chuck shaft 76 is rotatably mounted on a cam follower 77 which seats on a stationary cam 78 having low and high portions (hereinafter described) which cause the chuck 72 to be raised and lowered.

At the cap-feed position (FIG. 7) the low portion of cam 78 acts on the chuck shaft 76 to maintain the chuck 72 lowered so that a cap can be deposited in its cap-receiving portion 73. As the spindle 4 is moved to the gasket compound depositing position (FIGS. 8 and 9), the high portion of the cam 78 acts on the chuck shaft 76 thereby raising the chuck 72 and placing the cap A in close proximity to the nozzle 14 so that the gasket material (FIG. 9) is deposited directly onto the inside cover of the closure cap A.

After a closure cap has been lined with gasket material, the spindle 4 is moved to the cap take-off position (FIG. 10) at which time the low portion of cam 78 again acts on chuck shaft 76 to lower the chuck 72 and permit removal of the closure cap. A spring 79 is provided on the chuck shaft 76 to bias the chuck 72 to its lowermost position.

The cap-removing mechanism comprises an elevatable ejector head 80 mounted within the chuck 72 and having a depending central plunger 81 which is rotatably mounted on an ejector follower 82 extending through cam follower 77 and seated on an ejector cam 83. The ejector cam 83 is formed from a depressed central portion of the stationary cam 78. The ejector cam 83 presents its lowered portion to its follower 82 for the greater part of the travel of the spindle 4 so that the ejector head 80 is in its retracted position (FIGS. 7, 8, and 9) and the closure cap A is within the cup shaped receiving portion 73 of the chuck 72 and held there by permanent magnets 74.

When the cap A is to be removed (FIG. 10), the ejecting cam 83 presents its raised portion to the follower 82 to thus raise the ejector head 80 to lift the closure cap A out of the cup-shaped receiving portion 73 in chuck 72 and out of the magnetic field of the permanent magnets 74 to permit the closure cap to be removed by a take-off chute 23. A vent opening 84 is provided in the chuck 72 which communicates with cup-shaped portion 73 to prevent a vacuum from forming thereon. After the cap has been removed from the chuck, the lower portion of ejector cam 83 is again effective to lower the ejector head 80 under the influence of a spring 85 so that the chuck is in position to receive another cap.

Missing Cap Detector

A missing cap detector mechanism is provided to prevent the gasket material from being ejected from the nozzle when there is no cap present in a chuck.

Figure 17:
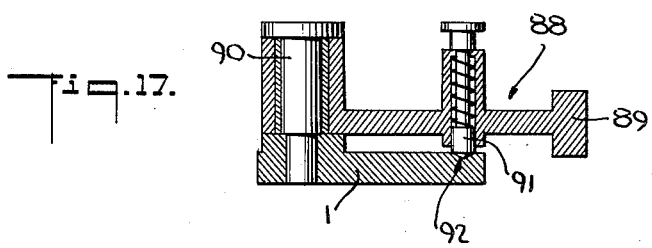
FIG. 17 is a sectional view taken along line 17—17 of FIG. 13 showing the details of the mechanism for preventing the gasket material from being deposited when no cap is present in the spindle.

This mechanism, generally designated by the reference character 25, is illustrated in FIGS. 13 and 17. The detector comprises a lever 88 having a magnetic or electronic proximity detector head 89 which has one lead connected to a conventional commercially available proximity control unit 60 (FIG. 6) and its other lead connected to a suitable power supply. The lever 88 is pivoted at 90 to the frame 1 and has a spring pressed locking finger 91 (FIG. 17) which is normally positioned in a depression 92 in the frame 1 to releasably hold the lever 88 in position.

When a spindle 4 with a cap therein passes the detector head 89 its presence will be sensed by the detector head 89 to energize the proximity control unit 60 (FIG. 6) causing its output voltage to open the air line control valve 49 to supply air to the nozzle control valves and to permit gasket material to be deposited by the nozzle into the cap. A proximity control unit 60 is used having a time delay unit which is set to hold the relay 49 open as long as the detector head senses a cap on each passing spindle 4. However, if there is no cap in a spindle 4 the detector head 89 will not sense a cap and the proximity control unit 60 will not be re-energized so that control valve 49 closes and no air is supplied to the system and no gasket material is ejected from the nozzle.

In the event that a cap is not correctly positioned on a spindle 4 it will be deposited on the rotating turret 3 and additional caps will tend to accumulate and jam the mechanism. The rotation of the turret 3 will thrust these caps against the detector lever 88 with such pressure that the locking finger 91 will be forced out of its depression 92 and the lever 88 will swing to the broken line position shown in FIG. 13 thereby causing the proximity detector to shut off the supply of air and at the same time setting off a suitable alarm, such as a bell, which alerts the operator that there is a jam-up of caps. The operated can then stop the machine, remove the jammed caps and reset the proximity detector lever 88 to its original position.

*Cap Feed Control*

A cap feed control mechanism, generally designated by reference character 24, is provided to feed the caps one at a time to the star wheel pockets 6. This feed control mechanism is shown in FIGS. 13 through 16.

Figure 2:
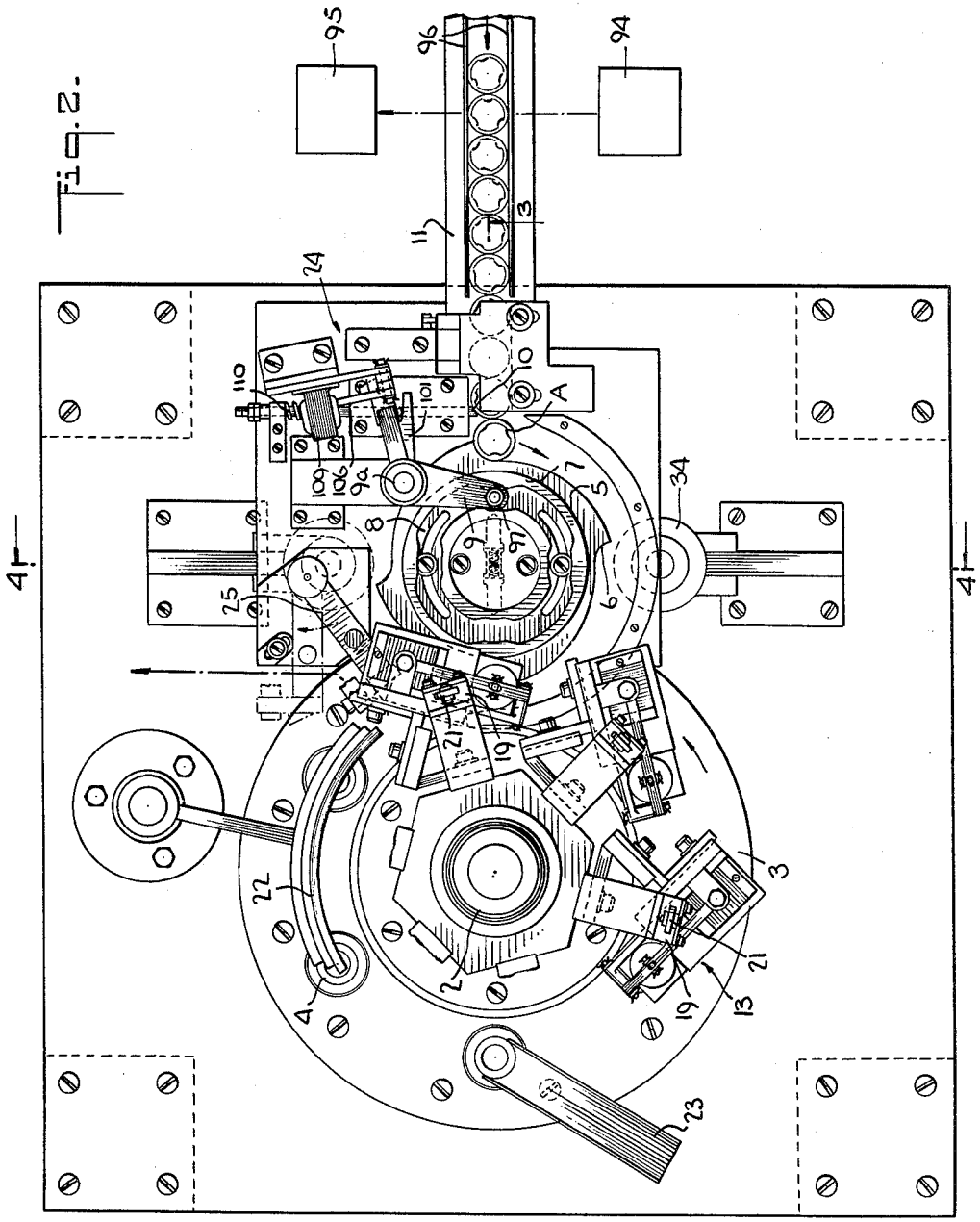
FIG. 2 is a top plan view of the mechanism showing the cap feeding mechanism and the mechanism for positively locating a closure cap on the spindles.

The caps are fed between a pair of rails 96 (FIGS. 2 and 13) and are lined up in a continuous row in front of the cap feed star wheel 5 by the conveyor 11. A reciprocating gate 10, in the form of an elongated bar (FIG. 15), allows a cap to be pushed into a pocket 6 of star wheel 5 by the line of caps each time that a pocket 6 passes the gate 10.

The gate 10 is reciprocated by a two arm lever 9 pivoted at 9a and controlled by a cam 8 in a cam cylinder 7 mounted on the star wheel 5. The cam 8 acts on a follower 97 mounted on one arm 98 of the two arm lever 9. Its other arm 99 (FIG. 14) is connected to the gate 10 through the intermediation of spring pressed latch 100 mounted on arm 99, connecting lever 101, and a dog 102 mounted on gate 10 and in engagement with the connecting lever 101. When the two arm lever 9 is rocked by cam 8 on star wheel 5 the gate 10 is reciprocated back and forth to permit a cap to be pushed into the pockets 6 of star wheel 5 each time the gate is retracted.

The cam 8 has a plurality of high portions 8a and low portions 8b corresponding to the number of pockets 6 in the star wheel 5 so that normally when the follower is in the high portion 8a the two arm lever 9 is in its counter-clockwise position and the gate 10 is retracted so that the foremost cap is pressing against the sides 5a of rotating star wheel 5. As a pocket 6 of the star wheel 5 comes along it will engage the foremost of these caps. At the same time the low portion 8b of the cam 8 acts on the two arm lever 9 to swing the lever 9 clockwise thereby sliding the gate forward to stop the next cap from being fed.

When caps are not fed rapidly enough toward the gate 10 by conveyor 11, the line of caps between guides 96 will shorten and have gaps which interferes with the positive feeding of caps to the star wheel 5. A photoelectric system including a light source 94 and a photoelectric cell 95 is provided to automatically keep the gate 10 closed until the line of caps is built up. This operates as follows.

The latch 100 (FIGS. 14, 15 and 16) is normally urged by spring 102 to lie in slots 103 and 104 in arm 99 and connecting lever 101, respectively, to connect arm 99 and lever 101 together so that when the arm 99 is rocked the gate 10 will reciprocate, and caps will feed to star wheel 5.

The arm 99 becomes disconnected from the connecting lever 101 when the latch 100 is moved out of the slots 103 and 104 to the broken line position shown in FIG. 16. The latch 100 is moved outwardly when an inclined surface 105 on a two arm solenoid lever 106 acts on a dog 107 mounted on latch 100 to push the latch 100 out of slots 103 and 104. The two arm solenoid lever 106 is connected to the armature 108 of a solenoid 109 so that when the solenoid is energized its armature 108 is retracted and the two arm lever 106 is swung counter-clockwise. This counter-clockwise motion permits the inclined surface 105 to act on the dog 107 to move the latch 100 out of slots 103 and 104 in arm 99 and connecting lever 101 thereby disconnecting the reciprocating two arm lever 9 from the gate 10. With the connecting lever 101 disconnected from arm 99, reciprocation of two arm lever 9 will have no effect on the gate 10 which will be urged continuously forward under the action of a spring 110 to its closed position so that no caps are fed. When the solenoid 109 is de-energized the latch will again connect the arm 99 to linkage 101 so that the gate 10 will again be reciprocated to feed the caps to the star wheel 5.

So long as the caps are in a solid line behind the gate 10 it will open and close in the manner described above. However, if there is a gap in the line of fed caps, opposite the photoelectric unit 94—95, the photoelectric unit 94—95 (FIG. 2) will energize the solenoid 109 (FIG. 15) which will retract its armature 108 to swing the solenoid lever 106 clockwise to disconnect the gate 10 as described above. The gate 10 remains in this closed position until the caps are again solidly lined up in guide rails 96 so that the photoelectric unit is de-energized whereupon the solenoid 109 will be de-energized to restore the latch 100 to its normal position connecting the arm 99 and the connecting lever 101 together so that gate 10 again reciprocates to feed the caps to the star wheel 5.

*Operation*

The caps A are fed by conveyor 11 through gate 10 to the pockets 6 of star wheel 5. The caps are next delivered by star wheel 5 to the chucks 72 of the rotating spindles 4 on turret 3 and are held therein by the permanent magnets 74 (FIG. 7). As the turret 3 rotates, each chuck 72 is raised by the cam 83 (FIG. 8) and a corresponding nozzle 14, which overlies each chuck 72, is opened to deposit gasket material on the rotating cap. The nozzles 14 are opened by a cam 22 which depresses plunger 20 to admit air to the air valve 16 (FIG. 3) to thus raise the nozzle control needle 57 through lever 18.

The spinning of the cap spreads the gasket material over the surface of the cap to form the gasket, as shown in FIG. 9. Where a ring gasket is desired, the nozzle 14 is placed in a position overlying the channel 210 (FIG. 9a) and the gasket material is deposited into the channel to form a ring gasket 211. As the turret 3 continues to rotate the plunger 20 (FIG. 1) passes out from under the stationary cam 22 and rises to shut off the air supply to the air valve 16 thus permitting the nozzle control needle 57 to be reseated on the nozzle opening 65 to shut off the supply of gasket material.

The chuck 72 is then lowered by the low portion of the cam 78 (FIG. 10). However, the plunger 81 which holds the ejector head 80 is now raised by the raised portion of the eject cam 83 to thereby free the cap from the magnetic field of the permanent magnets 74 and to permit it to be removed from the turret 3 by a suitable take-off chute 23.

If no cap is present in chuck 72, the proximity detector head 89 (FIGS. 6 and 13) will shut off the supply of air to the system through the proximity control unit 60 to prevent the nozzle 14 from opening and ejecting gasket compound. Also, if the caps are not correctly placed on a chuck 72, the caps will strike the detector lever 88 (FIG. 13) and swing it to the broken-line position of FIG. 13 to thus shut off the air supply and at the same time set off a suitable warning signal which will indicate to the operator the presence of incorrectly positioned caps.

If the caps being fed to the star wheel 5 are not in the solid lined-up relationship shown in FIG. 15, a photoelectric unit will energize the solenoid 109 which will cause the gate 10 to remain in the closed position shown in FIG. 15 so that no caps are fed to the star wheel. The gate 10 will remain in this position until the caps again are solidly lined up between the guide rails 96 so that the photoelectric unit de-energizes solenoid 109 to return the parts to their normal cap feeding position.

The present invention has been described in connection with a particular viscous liquid compound used to form a gasket. It will be understood, of course, that the mechanism and method described herein may also be used to apply any viscous liquid compound and particularly it may be used to apply an adhesive compound to the closure to bond a cut gasket into the closure, such as is shown in the copending United States patent application of Harry E. Stover, Serial No. 763,921, filed September 29, 1958, and now Patent No. 2,976,200.

It will be seen from the above that the present invention provides an improved mechanism and method for applying gasket material to closures in a continuous operation and at greater speeds. The mechanism is also easily adapted to apply gasket material to closures of various sizes by changing a minimum number of parts.

The present invention also provides a mechanism in which the operating speed of the machine is adjustable independently of the speed at which the individual cap holding spindles rotate. The improved nozzle and control system described will prevent uncontrolled dripping of gasket material and will thus increase the accuracy of the amount of gasket material deposited. Novel use is made of a proximity detector to detect the absence of a cap in a chuck to prevent the ejection of a gasket compound when no cap is present and to also warn the machine operator when caps are incorrectly positioned on the turret. The present invention also includes an improved mechanism for positive positioning of the closure caps in the turret feeding star wheel to facilitate high speed operation.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. A mechanism for applying a viscous liquid compound to closure caps in a continuous operation comprising a turret having a plurality of cap-receiving spindles, means for depositing closure caps onto said spindles, means for rotating said spindles, means on said turret overlying said spindles for depositing a viscous liquid compound directly to said closure caps while said spindles are rotating, means for raising said spindles together with the caps therein during the deposition of said viscous liquid compound to bring the closure caps closer to said compound depositing means during the deposition of said compound, means for rotating said turret together with said cap-receiving spindles and said compound depositing means from a cap-receiving position to a cap-discharging position, a plunger mounted in said spindle, and cam means below said turret for lifting the plunger and raising the closure cap off said spindle at said cap discharging position.

2. A mechanism as described in claim 1, wherein said compound applying means comprises a nozzle overlying each of said spindles, said nozzles are normally closed by an elevatable needle mounted therein, said needle being elevated by an air cylinder, an air valve to supply air to said air cylinder, and wherein a stationary cam is provided above said air valve for opening said air valve for supplying air to said air cylinder to elevate said needle and open said nozzle.

3. A mechanism as claimed in claim 2, wherein cam means are provided below said turret for raising said spindles before said nozzles apply the viscous liquid compound to said cap to place the cap in proximity to said nozzles and for lowering said spindles after the viscous liquid compound is applied to the closure cap.

4. A mechanism as claimed in claim 3, wherein said means for depositing caps comprises a rotatable star wheel and wherein drive means are provided for rotating said star wheel and said turret, said drive means comprising a pair of independently driven gears, said gears being mounted on a shaft depending from the star wheel and are in superimposed relationship to each other and wherein one of said gears is adapted to simultaneously rotate said turret and star wheel and is rigidly mounted on said star wheel shaft and wherein the other of said gears is adapted to rotate said spindles and is rotatably mounted on said star wheel shaft.

5. A mechanism as claimed in claim 4, wherein detector means are provided adjacent said turret adapted to sense the presence of a cap in said cap-receiving spindles and to prevent the application of compound if no cap is present in said cap-receiving spindles, said detector means comprises a pivotally mounted lever having a detector head and wherein said lever is adapted to be pushed away from said turret by the closure caps when caps accumulate on said turret.

6. A mechanism as claimed in claim 5, wherein a star wheel is provided for depositing caps on said cap-receiving spindles, means for maintaining closure caps in a continuous row and for supplying caps to the star wheel, said supply means comprising a gate, said gate being actuated by said rotating star wheel for reciprocating movement, means for preventing caps from being supplied when there is an interruption in the continuous row of caps, said means comprising means for disengaging said gate from said rotating star wheel to prevent reciprocation of said gate.

References Cited in the file of this patent

UNITED STATES PATENTS

| | | |
|---|---|---|
| 1,956,012 | Egan | Apr. 24, 1934 |
| 2,419,951 | Kastel | May 6, 1947 |
| 2,654,343 | Burbank et al. | Oct. 6, 1953 |
| 2,679,660 | Bain | June 1, 1954 |
| 2,731,946 | Birkland | Jan. 24, 1956 |
| 2,781,738 | Paasche | Feb. 19, 1957 |
| 2,846,335 | Alholm et al. | Aug. 5, 1958 |
| 2,888,366 | Barsky et al. | May 26, 1959 |
| 2,954,585 | Simpson | Oct. 4, 1960 |